United States Patent [19]
Ema

[11] Patent Number: 6,012,291
[45] Date of Patent: Jan. 11, 2000

[54] TEMPERATURE CONTROL DEVICE OF AN OPTICAL SEMICONDUCTOR DEVICE

[75] Inventor: Takayuki Ema, Tokyo, Japan

[73] Assignee: Ando Electric Co., Ltd., Tokyo, Japan

[21] Appl. No.: 08/997,863

[22] Filed: Dec. 24, 1997

[30] Foreign Application Priority Data

Dec. 27, 1996 [JP] Japan .................................. 8-358168

[51] Int. Cl.$^7$ .................................................. F25B 21/02
[52] U.S. Cl. .......................................... 62/3.7; 62/259.2
[58] Field of Search .................................. 62/3.7, 259.2

[56] References Cited

U.S. PATENT DOCUMENTS

| | | | |
|---|---|---|---|
| 3,121,998 | 2/1964 | Nagata ........................................ | 62/3.7 |
| 5,515,682 | 5/1996 | Nagakubo et al. ......................... | 62/3.7 |
| 5,522,225 | 6/1996 | Eskandari .................................. | 62/3.7 |
| 5,690,849 | 11/1997 | DeVilbiss et al. ...................... | 219/497 |
| 5,704,213 | 1/1998 | Smith et al. .............................. | 62/3.7 |
| 5,927,077 | 7/1999 | Hisai et al. ............................... | 62/3.3 |

*Primary Examiner*—Henry Bennett
*Assistant Examiner*—Melvin Jones
*Attorney, Agent, or Firm*—Flynn, Thiel, Boutell & Tanis, P.C.

[57] ABSTRACT

A temperature control device of an optical semiconductor device is provided for keeping the optical semiconductor device constant. An optical semiconductor device is fixed to a thermal conductor. One thermistor is arranged on the thermal conductor at the portion where it is susceptible stronger to an ambient temperature rather than the optical semiconductor device is susceptible to the ambient temperature while another thermistor is arranged on the thermal conductor at the portion where it is susceptible weaker to the ambient temperature rather than the optical semiconductor device is susceptible to the ambient temperature. The difference between an average temperature of the thermal conductor at two points detected by the thermistors and a set temperature is detected by a temperature detecting means comprising a bridge circuit having the thermistors which are connected to each other so as to form opposing sides of the bridge circuit and a differential amplifier for receiving an imbalanced voltage of the bridge circuit. The thus detected difference of the temperature is outputted to a temperature control circuit, whereby the temperature control circuit controls a Peltier driving current of a Peltier element so that the average temperature of the thermal conductor at two points thereof and the set temperature become equal to each other.

2 Claims, 3 Drawing Sheets

TEMPERATURE CONTROL DEVICE OF AN OPTICAL SEMICONDUCTOR DEVICE

BACKGROUND OF THE INVENTION

1. Field of the Invention

The present invention relates to a temperature control device of an optical semiconductor device needing an environment which is less changed in temperature, particularly to that having temperature detecting points where the optical semiconductor device is clamped at both sides, in which one is susceptible to an ambient temperature and the other is not susceptible to the ambient temperature rather than the optical semiconductor device to the ambient temperature, and wherein an average temperature at both temperature detecting points is constant, thereby controlling the temperature of the optical semiconductor device.

2. Prior Art

A conventional temperature control device of an optical semiconductor device of this type is used for permitting the temperature of optical semiconductor device, etc. to keep constant. FIG. 4 is a block diagram showing one example of a construction of the conventional temperature control device of an optical semiconductor device. In FIG. 4, a thermal conductor 2 is a block made of a material of high thermal conductivity such as copper, iron, etc. An optical semiconductor device 1 is fixed to a surface 2a of the thermal conductor 2 and a Peltier element 5 is jointed to one side surface of the thermal conductor 2 at a jointing surface 5a.

A temperature detecting circuit 6 detects the difference between a temperature of the thermal conductor 2 at a temperature detecting point 12 to which the optical semiconductor device 1 is fixed and a set temperature, and output a temperature detecting signal to a temperature control circuit 4. The temperature control circuit 4 controls a Peltier driving current for applying to the Peltier element 5 in response to the temperature detecting signal. The Peltier element 5 changes the temperature of the jointing surface 5a of the thermal conductor 2 upon a reception of the Peltier driving current, thereby controlling the temperature of the optical semiconductor device 1 by way of the thermal conductor 2.

The operation of the temperature control device of an optical semiconductor device will be now described. When the ambient temperature is changed, the temperature of the optical semiconductor device 1 and that of the thermal conductor 2 to which the optical semiconductor device 1 is fixed are also changed. The temperature detecting circuit 6 detects the difference between the temperature of the temperature detecting point 12 and the set temperature, and output a temperature detecting signal to the temperature control circuit 4. The temperature control circuit 4 controls the Peltier driving current to be applied to the Peltier element 5 so as to secure a negative feedback in response to the temperature detecting signal.

When the Peltier driving current to be applied to the Peltier element 5 is changed in its direction, the thermal conductor 2 is cooled or the temperature of the temperature detecting point 12 of the heated thermal conductor 2 becomes a set temperature. In such a manner, when the temperature of the thermal conductor 2 is detected to control the temperature of the temperature control device of an optical semiconductor device so as to permit the temperature of the thermal conductor 2 to be constant, thereby keeping the temperature of the optical semiconductor device 1 fixed to the thermal conductor 2 constant.

However the conventional temperature control device of an optical semiconductor device has a problem in that since the temperature detecting point 12 is spaced apart from the optical semiconductor device 1, and hence it is susceptible from the ambient temperature so that there occurs a difference of temperature between the temperature detecting point 12 and the optical semiconductor device 1.

SUMMARY OF THE INVENTION

It is therefore an object of the present invention to provide a temperature control device of an optical semiconductor device capable of keeping the temperature of an optical semiconductor device constant even if a part of the thermal conductor is susceptible to an ambient temperature because the change of temperature of the optical semiconductor device is restrained by the change of inclination of temperature of the thermal conductor caused by the influence of the ambient temperature, a heat source, etc.

To achieve the above object, a temperature control device of an optical semiconductor device of the present invention comprises a thermal conductor 2 to which an optical semiconductor device 1 is fixed, a Peltier element 5 fixed to the thermal conductor 2, two thermistors 11a and 11b which are attached to the thermal conductor 2 at positions where they are susceptible stronger and weaker to an ambient temperature than the optical semiconductor device 1 is susceptible to the ambient temperature so as to detect temperatures of the thermal conductor 2 at two points, a temperature detecting means 3 for detecting the difference between an average temperature of the thermal conductor 2 at two points detected by the thermistors 11a and 11b and a determined set temperature, and for outputting a temperature detecting signal, and a temperature control circuit 4 for outputting a Peltier driving current to the Peltier element 5 in response to the temperature detecting signal, thereby keeping the optical semiconductor device 1 constant by way of the thermal conductor 2.

PREFERRED EMBODIMENT OF THE INVENTION

Figure 1:
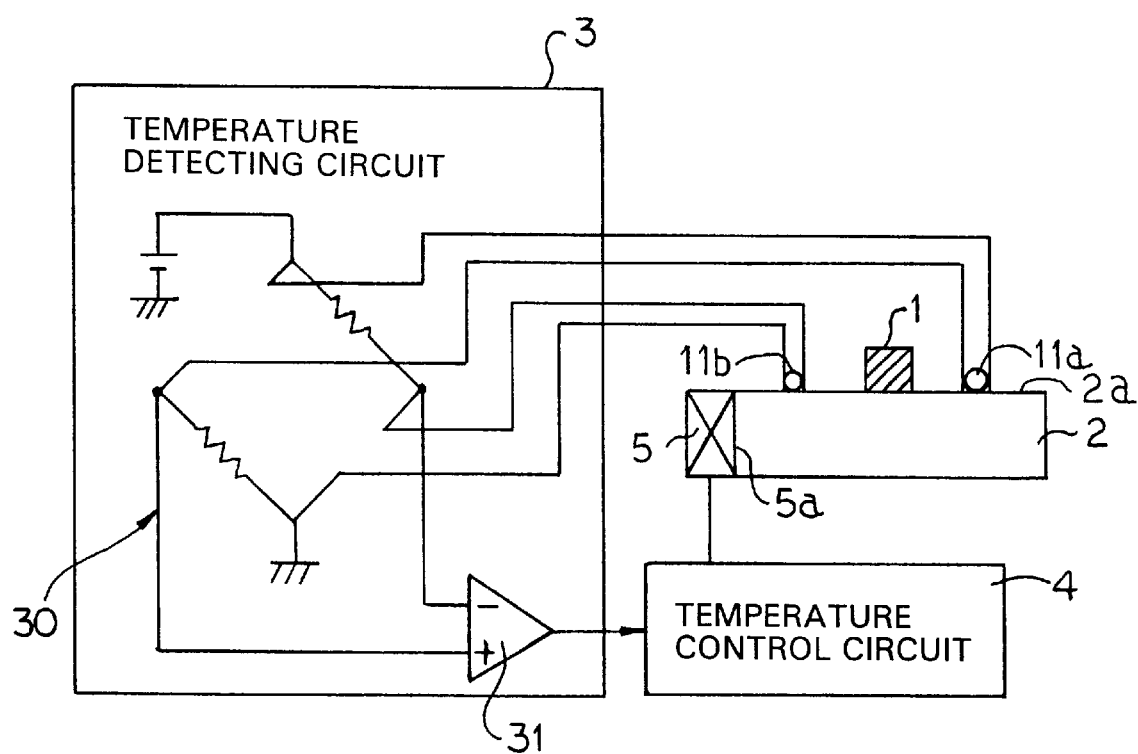
FIG. 1 is a block diagram showing an example of a temperature control device of an optical semiconductor device according to the present invention.

A temperature control device of an optical semiconductor device of the present invention will be now described with reference to FIG. 1 which is a block diagram showing a structure of the temperature control device of an optical semiconductor device according to the preferred embodiment of the invention.

An optical semiconductor device 1 comprises a laser diode, an LED, a photodiode, etc. A thermal conductor 2 comprises a block made of a material having an excellent conductivity such as copper, iron. The optical semiconductor device 1 is fixed to a surface 2a of the thermal conductor 2, and a Peltier element 5 is jointed to a jointing surface 5a of the thermal conductor 2 at one side surface thereof.

Thermistors 11a and 11b are respectively attached to the surface 2a of the thermal conductor 2 where they are susceptible stronger and weaker to an ambient temperature rather than the optical semiconductor device 1 is susceptible to the ambient temperature. That is, the temperature control device of an optical semiconductor device is arranged in a manner that the optical semiconductor device 1 is narrowed in position by the thermistors 11a and 11b wherein the thermistor 11a is positioned at the portion where it is susceptible stronger to the ambient temperature rather than the optical semiconductor device 1 is susceptible to the ambient temperature while the thermistor 11b is positioned at the portion where it is hardly susceptible to the ambient temperature rather than the optical semiconductor device 1 is susceptible to the ambient temperature.

The thermistors 11a and 11b detect the temperature of the thermal =conductor 2 at two points of the surface 2a thereof, and supply the detected output to a temperature detecting means 3 (hereinafter referred to as a temperature detecting circuit 3). The temperature detecting circuit 3 receives the detected output from the thermistors 11a and 11b, amplifies the difference between an average temperature of the thermal conductor 2 at two points of the surface 2a thereof and a predetermined set temperature, and outputs a temperature detecting signal to the temperature control means 4 (hereinafter referred to as temperature control circuit 4).

The temperature control circuit 4 controls a Peltier driving current to be applied to a Peltier element 5 so as to generate a negative feedback in response to the temperature detecting signal. When the Peltier driving current is applied to the Peltier element 5, the Peltier element 5 changes the temperature of the jointing surface 5a jointed to the thermal conductor 2, then controls the temperature of the optical semiconductor device 1 by way of the thermal conductor 2.

The operation of the temperature control device of an optical semiconductor device will be now described. The thermistors 11a and 11b detect the temperatures of the surface 2a of the thermal conductor 2 at two points where they are arranged. The detected outputs of the thermistors 11a and 11b are respectively supplied to the temperature detecting circuit 3. When the ambient temperature changes in this state, the temperature detecting circuit 3 amplifies the difference between an average temperature of the surface 2a of the thermal conductor 2 at two points where the thermistors 11a and 11b are arranged and a predetermined set temperature, then outputs a temperature detecting signal.

The temperature control circuit 4 controls a Peltier driving current to be applied to the Peltier element 5 so as to secure a negative feedback in response to the temperature detecting signal. The thermal conductor 2 is cooled or heated in response to the direction of the Peltier driving current to be applied to the Peltier element 5, and an average temperature detected by the thermistors 11a and 11b of the thermal conductor 2 becomes the set temperature. The temperature of the optical semiconductor device 1 fixed to the thermal conductor 2 keeps constant by detecting the temperature of the thermal conductor 2 at two points by the thermistors 11a and 11b and controlling the temperature for permitting the average temperature detected by the thermistors 11a and 11b to be constant.

Figure 3:
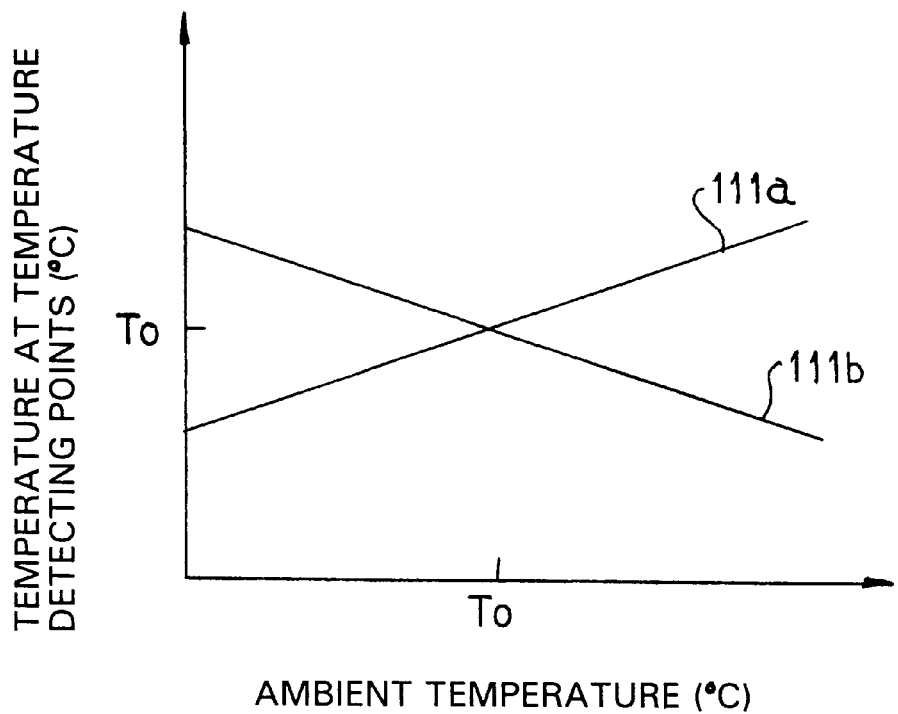
FIG. 3 is a view showing the relation between an ambient temperature and temperatures of thermistors.
Figure 4:
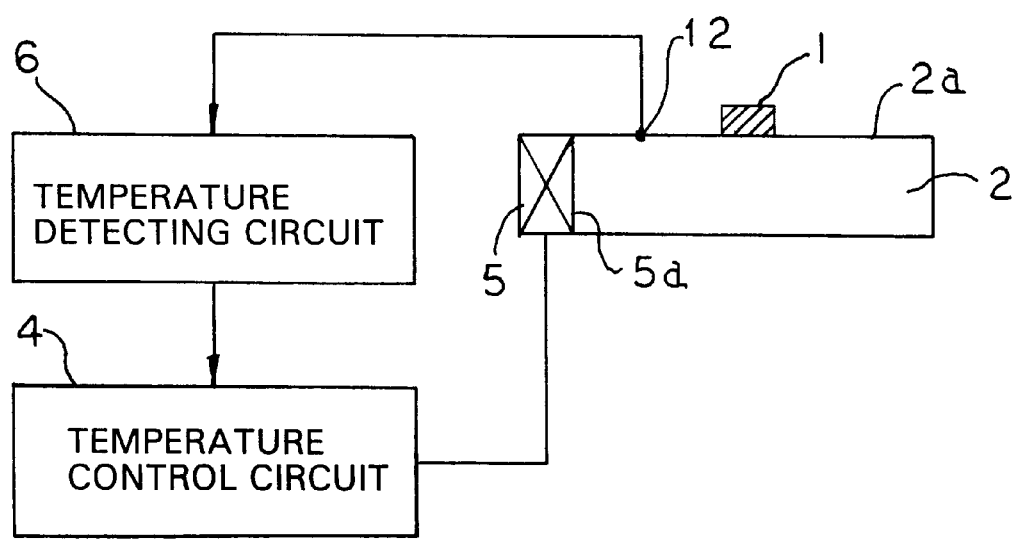
FIG. 4 is a block diagram showing a conventional temperature control device of an optical semiconductor device.

FIG. 3 is a vies showing the relation between the ambient temperature and a temperature 111a of the thermistor 11a, and a temperature 111b of the thermistor 11b in this preferred embodiment of the invention.

The thermistor 11a is susceptible stronger to the ambient temperature rather than the optical semiconductor device 1 is susceptible to the ambient temperature, since it is positioned at the portion remote from the Peltier element 5 compared with the optical semiconductor device 1. The thermistor 11b is susceptible weaker to the ambient temperature rather than the optical semiconductor device 1 is susceptible to the ambient temperature since it is positioned at the portion close to the Peltier element 5 rather than the optical semiconductor device 1. As a result, there occurs the difference of temperature between the thermistor 11a and the thermistor 11b. Since the thermistor 11a is susceptible stronger to the ambient temperature, the temperature 111a of the thermistor 11a increases with the increase of the ambient temperature.

On the other hand, since the temperature 111b of the thermistor 11b is controlled so that the average temperature of the thermistors 11a and 11b becomes constant, the temperature 111b of the thermistor 11b decreases with the increase of the ambient temperature. In the preferred embodiment, the optical semiconductor device 1 is disposed in the middle of the thermistors 11a and 11b so that the temperature of the optical semiconductor device 1 becomes an intermediate temperature between the temperature of the thermistor 11a and that of the thermistor 11b, thereby restraining the change of temperature of the optical semiconductor device 1 with the influence of the ambient temperature.

When the optical semiconductor device 1 generates heat, the optical semiconductor device 1 is positioned in a manner that the optical semiconductor device 1 has an intermediate temperature between the temperatures of the thermistors 11a and 11b, thereby restraining the change of temperature of the optical semiconductor device 1 owing to the influence of the ambient temperature.

Figure 2:
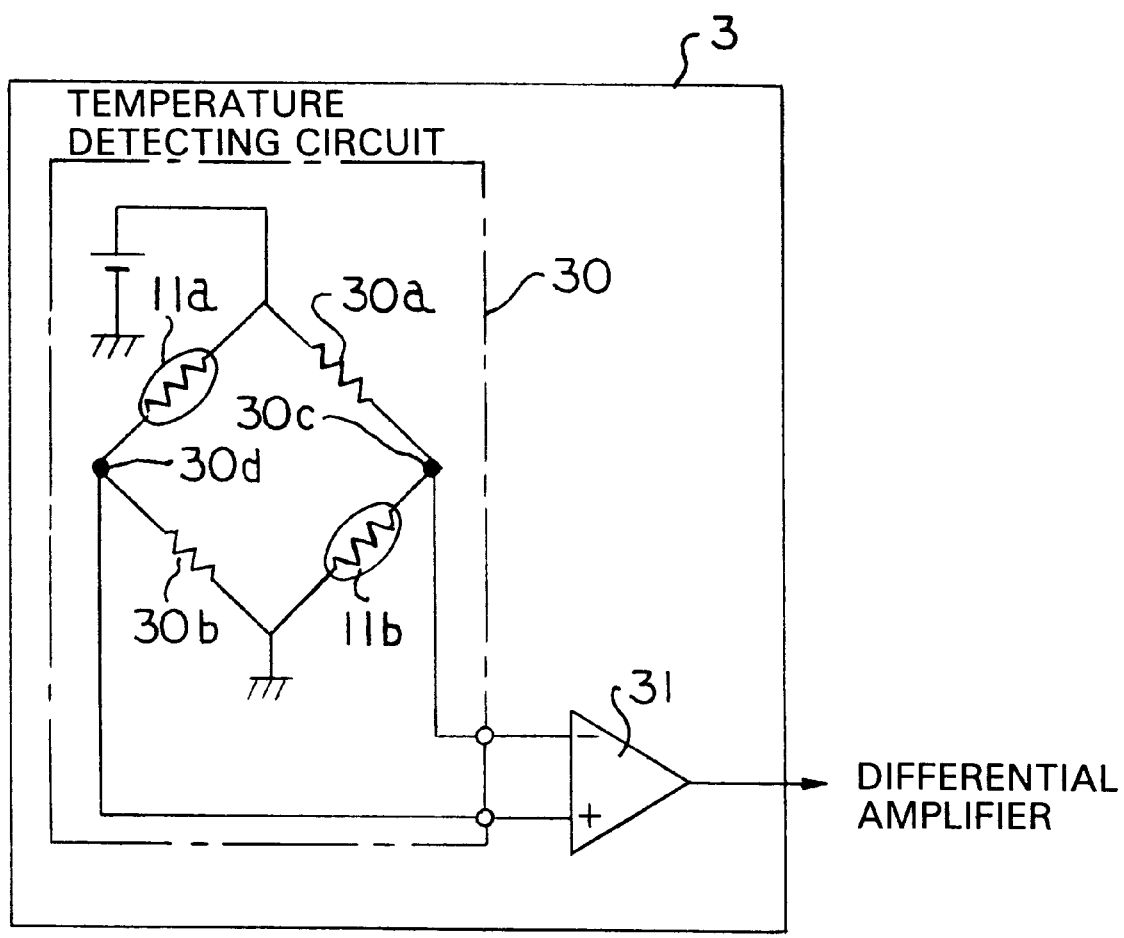
FIG. 2 is a circuit diagram showing a temperature detecting circuit of FIG. 1.

The internal construction of the temperature detecting circuit 3 will be now described. FIG. 2 is a block diagram showing the construction of the temperature detecting circuit 3 according to the preferred embodiment of the invention. The temperature detecting circuit 3 in FIG. 2 comprises a bridge circuit 30 which is formed of the thermistor 11a and thermistor 11b having the same characteristics, a resistor 30a and a resistor 30b, and a differential amplifier 31 for receiving imbalanced voltage outputs 30c and 30b. The thermistor 11a and thermistor 11b which are connected to each other by way of the resistors 30a and 30b form the opposing sides of the bridge circuit 30.

Since the negative feedback is secured so that the detecting signal of the temperature detecting circuit 3 becomes 0 V, the bridge circuit 30 is always balanced in a normal state. The following expression (1) is established assuming that a set temperature is T0, a temperature of the thermistor 11a is T0+t1, temperature of the thermistor 11b is T0−t2:

$$R1 \times R2 = RTH(T0+t1) \times RTH(T0-t2) \tag{1}$$

R1: resistance value of the resistor 30a
R2: resistance value of the resistor 30b
RTH (T0+t1): resistance value of the thermistor 11a
RTH (T0−t2): resistance value of the thermistor 11b
R1×R2 is expressed in the following expression (2) assuming that t1=t2=0.

$$R1 \times R2 = RTH(T0)2 \tag{2}$$

The following expression (4) is got by (the expression showing the relation between the resistance value of the thermistors and the temperature expressed by the following expression (3) and the expression (1).

$$RTH(K1) = RTH(K0) \times EXP\{B \times (1/K1 - 1/K0)\} \tag{3}$$

RTH (K1): resistance value of the thermistor at temperature K1 (K)

RTH (K0): resistence value of the thermistor at temperature K0 (K)

B: Constant B $$RTH(T0)2 = RTH(T0)2 \times EXP\{B \times (1/(T0+t1)+1/(T0-t2)-2/T0)\} \quad (4)$$

The following expression is established when t1 of the expression (4) is solved.

$$t1 = T0 \times t2/(T0-2t2) \quad (5)$$

Since the T0 is normally about 300 k, and it is very large with respect to difference 2t2 between the set temperature T0 and the temperature of thermistor 11b, the following approximate expression is established assuming that T0−2t0=T0

$$t1 = t2 \quad (6)$$

Since the temperature of the thermistor 11a is expressed by T0+t1 and the temperature of the thermistor 11b is expressed by T0−t1 from the expression (6), the average value of the thermistor 11a and 11b is expressed as follows, and which becomes normally T0.

$$(T0+t1+T0-t1)/2 = T0 \quad (7)$$

In this preferred embodiment, the; thermistors 11a and 11b reactively use thermistors having 10 kΩ at 25° C. and they are fixed to the thermal conductor 2 at portions where they are susceptible stronger end weaker to the ambient temperature rather than the optical semiconductor device 1 is susceptible to the ambient temperature. When the difference of the temperatures between the optical semiconductor device 1 and the thermistor 11a is equal to that between the optical semiconductor device 1 and the thermistor 11b, the change of temperature can be minimized. Since the resistors 30a and 30b use thermistors having 10 kΩ at 25° C., they have 10 kΩ from the expression (2). The constant B of the thermistor may be in an arbitrary value.

According to the temperature control device of an optical semiconductor device of the present invention, the two temperature detecting points are provided on the thermal conductor to which the optical semiconductor device is fixed, and the optical semiconductor device is disposed at the intermediate portion between the two temperature detecting points, wherein the thermal conductor is controlled in the manner that the average temperature at the two points becomes constant, thereby restraining the variation of temperature of the optical semiconductor device owing to the temperature inclination of the thermal conductor which is caused by the influence of the ambient temperature, or other heat sources, or the like.

Accordingly, the temperature of the optical semiconductor device can always keep constant even if the structure of the temperature control device of an optical semiconductor device is susceptible to the ambient temperature at a part of the thermal conductor.

What is claimed is:

1. A temperature control device of an optical semiconductor device comprising:

a thermal conductor to which an optical semiconductor device is fixed;

a Peltier element fixed to the thermal conductor;

two thermistors which are attached to the thermal conductor at positions where they are susceptible stronger and weaker to an ambient temperature than the optical semiconductor device is susceptible to the ambient temperature so as to detect temperature of the thermal conductor at two points;

a temperature detecting means for detecting the difference between an average temperature of the thermal conductor at two points detected by the thermistors and a determined set temperature, thereby outputting a temperature detecting signal; and a temperature control circuit for outputting a Peltier driving current to the Peltier element in response to the temperature detecting signal, thereby keeping the optical semiconductor device constant by way of the thermal conductor.

2. The temperature control device of an optical semiconductor device according to claim 1, wherein the temperature detecting means comprises a bridge circuit having the thermistors which are connected to each other so as to form opposing sides of the bridge circuit and a differential amplifier for receiving an imbalanced voltage of the bridge circuit.

* * * * *